(12) United States Patent
Wong

(10) Patent No.: US 6,778,243 B2
(45) Date of Patent: Aug. 17, 2004

(54) MULTI-DOMAIN FLAT DISPLAY

(75) Inventor: Jia-Fam Wong, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 42 days.

(21) Appl. No.: 10/097,050

(22) Filed: Mar. 12, 2002

(65) Prior Publication Data

US 2002/0135723 A1 Sep. 26, 2002

(30) Foreign Application Priority Data

Mar. 20, 2001 (TW) ...................................... 90106432 U

(51) Int. Cl.$^7$ ........................................... G02F 1/1337
(52) U.S. Cl. ..................................................... 349/129
(58) Field of Search ................................ 349/123, 128, 349/129, 130, 131, 132

(56) References Cited

U.S. PATENT DOCUMENTS

| | | | |
|---|---|---|---|
| 5,636,042 A | | 6/1997 | Nakamura et al. .......... 349/123 |
| 6,188,457 B1 | * | 2/2001 | Liu ............................. 349/129 |
| 6,437,845 B1 | * | 8/2002 | Yamada et al. ............. 349/128 |
| 6,476,896 B1 | * | 11/2002 | Liu ............................. 349/129 |
| 6,567,144 B1 | * | 5/2003 | Kim et al. ................... 349/128 |
| 6,570,636 B2 | * | 5/2003 | Kim et al. ................... 349/130 |
| 6,573,965 B1 | * | 6/2003 | Liu et al. .................... 349/129 |

FOREIGN PATENT DOCUMENTS

JP        11-242225        9/1999

* cited by examiner

Primary Examiner—Robert H. Kim
Assistant Examiner—Richard H Kim
(74) Attorney, Agent, or Firm—Ladas & Parry

(57) ABSTRACT

A multi-domain liquid crystal display (LCD) has a plurality of first alignment-control structures arranged on an inner surface of an upper substrate, and a plurality of second alignment-control structures arranged on an inner surface of a lower substrate. An upper concave is formed between two adjacent first alignment-control structures, and an upper inclined plane is formed between the upper concave and the first alignment-control structure. A lower concave is formed between two adjacent second alignment-control structures, and a lower inclined plane is formed between the lower concave and the second alignment-control structure. Each first alignment-control structure is positioned above a corresponding lower concave, each second alignment-control structure is positioned under a corresponding upper concave, and the upper inclined plane is close to and faces the lower inclined plane.

14 Claims, 11 Drawing Sheets

MULTI-DOMAIN FLAT DISPLAY

BACKGROUND OF THE INVENTION

1. Field of the Invention

The present invention relates to a liquid crystal display (LCD) and, more particularly, to a multi-domain LCD.

2. Description of the Related Art

Applying a voltage to a liquid crystal display (LCD) changes the alignment of liquid crystal molecules, and then the resulting optical characteristics, such as double refraction, optical rotation, dichromatism, optical confusion and optical scattering cause display variations. Compared with the electric-optical materials used in other optical devices, liquid crystal molecules can distribute substantial variations in optical characteristics with low voltage and low power consumption, and without further treatments. In addition, LCD has the advantages of a thin profile and a lightweight. Therefore, as we know, LCDs play an important role in the flat display market.

Display modes in LCDs differ with each other according to different types of liquid crystal molecules utilized therein. One mode, electrically controlled birefringence (ECB), employs an applied electric field to control the multi-refraction characteristics of the liquid crystal molecules. For example, nematic liquid crystal molecules having a negative anisotropy of dielectric constant are utilized together with a vertical alignment layer. When the applied voltage exceeds a threshold voltage, the liquid crystal molecules that are originally aligned perpendicular to the vertical alignment layer will rotate to an angle corresponding to the applied electric field. As well, to further control the alignment of the liquid crystal molecules, an alignment-control structure is fabricated to increase the number of alignment domain in each pixel area. It is thus possible to reach the goals of wide view angle and high contrast.

Referring to FIG. 1 and FIG. 2, FIG. 2 is a top view of the alignment-control structure in a conventional LCD cell 10, and FIG. 1 is a schematic cross-sectional diagram along line I–I' of FIG. 2. As shown in FIG. 1, the LCD cell 10 comprises an upper glass substrate 12, a lower glass substrate 14, and a liquid crystal layer 16 with a negative anisotropy of dielectric constant filling in the space between the two glass substrates 12 and 14. Two electrodes 18 and 22 and two vertical alignment layers 20 and 24 are respectively formed on the inner surface of the glass substrates 12 and 14. Two polarizers 26 and 28 are respectively formed on the outer surface of the glass substrates 12 and 14. In general, the upper glass substrate 12 serves as a color filter substrate. The lower glass substrate 14 serves as a thin film transistor (TFT) substrate where a plurality of TFTs and active matrix drive circuits are formed. The electrode 22 on the lower glass substrate 14 serves as a pixel electrode 22. Furthermore, the LCD cell 10 has a plurality of first strip-shaped protrusions 30 and second strip-shaped protrusions 32 respectively formed above the electrodes 18 and 22 to serve as the alignment-control structures.

As shown in FIG. 2, two transversely-extending gate lines 36 and two lengthwise-extending signal lines 38 define a pixel area. A TFT structure 39 is formed near the intersection of the gate line 36 and the signal line 38, and the pixel electrode 22 is formed on the pixel area. On the upper glass substrate 12, the first strip-shaped protrusions 30 extend transversely and pass through the gate lines 36. On the lower glass substrate 14, the second strip-shaped protrusion 32 extends transversely and passes through the center of the pixel electrode 22. In this way, the first protrusions 30 and the second protrusions 32 extend in parallel to each other and are arranged alternately.

FIGS. 3 and 4 are schematic diagrams showing the variation in alignment of the liquid crystal molecules. As shown in FIG. 3, when no voltage is applied, the liquid crystal layer 16 having a negative anisotropy of dielectric constant is arranged between the vertical alignment layers 20 and 24, all the liquid crystal molecules in the liquid crystal layer 16 are aligned perpendicular to the vertical alignment layers 20 and 24, respectively. For example, the liquid crystal molecules 16A are aligned perpendicular to the glass substrates 12 and 14. The liquid crystal molecules 16B above the protrusions 30 and 32 are vertical to the perpendicular alignment layers 20 and 24 above the protrusions 30 and 32, so that the liquid crystal molecules 16B above the protrusions 30 and 32 are positioned at an angle to the glass substrates 12 and 14.

As shown in FIG. 4, after the voltage is applied to the LCD cell 10, the liquid crystal molecules will rotate perpendicular to the electric field. The arrows show the rotating directions of the liquid crystal molecules. For example, the liquid crystal molecules $16B_1$, aligned from the upper right toward the lower left in the beginning, and will be rotated in a clockwise direction after the voltage is applied so that the liquid crystal molecules $16B_1$ fall in the direction parallel to the vertical alignment layers 20 and 24. Consequently, the adjacent liquid crystal molecules $16A_1$ will rotate in a clockwise direction according to the behavior of the liquid crystal molecules $16B_1$. In a similar manner, the liquid crystal molecules $16B_2$ are positioned from the upper left toward the lower right in the beginning, and then fall in the direction parallel to the vertical alignment layers 20 and 24 and rotate in a counterclockwise direction while the voltage is applied. As a result, the adjacent liquid crystal molecules $16A_2$ will rotate in a counterclockwise direction according to the behavior of the liquid crystal molecules $16B_2$.

FIG. 5 is a top view showing the alignment domain of the liquid crystal layer 16. After a voltage is applied, these liquid crystal molecules will rotate to parallel to the direction of electric field. Upon application of voltage to the LCD cell 10, part of the liquid crystal molecules $16A_1$ and $16B_1$ rotate in a clockwise direction and another part of liquid crystal molecules $16A_2$ and $16B_2$ rotates in a counterclockwise direction. Accordingly, two alignment domains are formed both sides of the second protrusion 32 in a pixel area. The arrows show the alignment direction.

However, since the alignment-control structure only forms two domains in a pixel area, this cannot satisfy the requirements of a wide view angle and a high contrast in the LCD. Also, the alignment-control structure is the strip-shaped protrusions 30 and 32, so the aperture ratio of the LCD is reduce, resulting in decreased brightness and lower contrast. Thus, a multi-domain LCD solving the aforementioned problems is called for.

SUMMARY OF THE INVENTION

The present invention provides rectangular protrusions in one pixel area to serve as the alignment-control structure.

The LCD includes an upper substrate having an upper electrode on the inner surface of the upper substrate, a lower substrate having a lower electrode on the inner surface of the lower substrate, and a liquid crystal layer with a negative anisotropy of dielectric constant filling the space between the upper substrate and the lower substrate. An electric field is formed between the upper electrode and the lower electrode. A plurality of first alignment-control structures are arranged on the inner surface of the upper substrate, an upper concave is formed between two adjacent first alignment-control structures, and an upper inclined plane is formed between the upper concave and the first alignment-control structure. A plurality of second alignment-control structures are arranged on the inner surface of the lower substrate, a lower concave is formed between two adjacent second alignment-control structures, and a lower inclined plane is formed between the lower concave and the second alignment-control structure. The first alignment-control structure is positioned above the lower concave, and the second alignment-control structure is positioned under the upper concave. The first alignment-control structure and the corresponding lower concave have a first substantially equal size. The second alignment-control structure and the corresponding upper concave have a second substantially equal size. The upper inclined plane is close to and faces the lower inclined plane.

Accordingly, it is an object of the invention to provide the alignment-control structures to achieve more than two domains in one pixel area.

It is another object of the invention to satisfy the requirements of a wide view angle and a high contrast Yet another object of the invention is to improve the brightness and contrast so as to assure the display quality of the multi-domain LCD.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

[First Embodiment]

Figure 1:
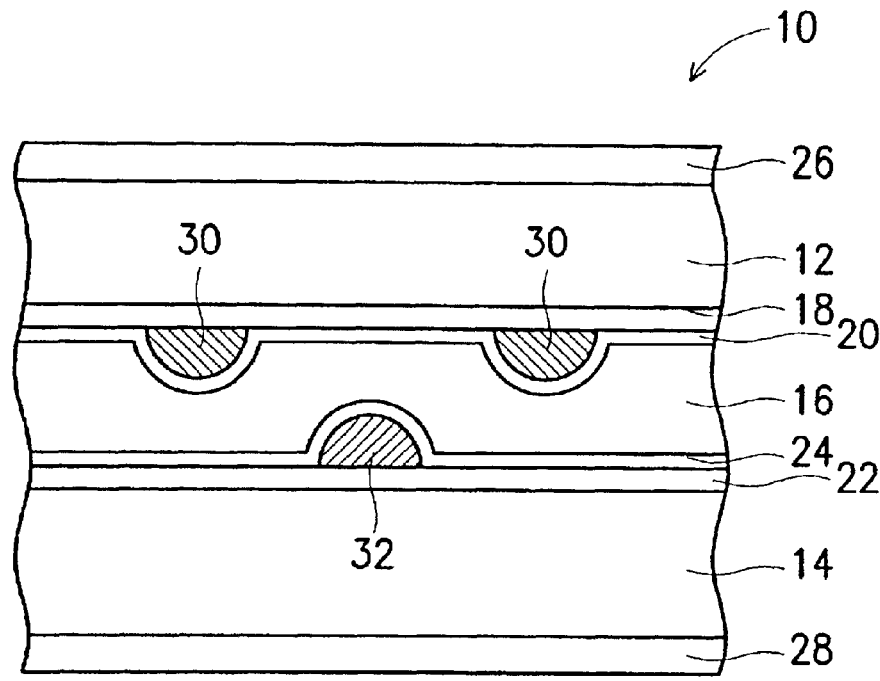
FIG. 1 is a schematic cross-sectional diagram showing a conventional LCD cell 10.
Figure 2:
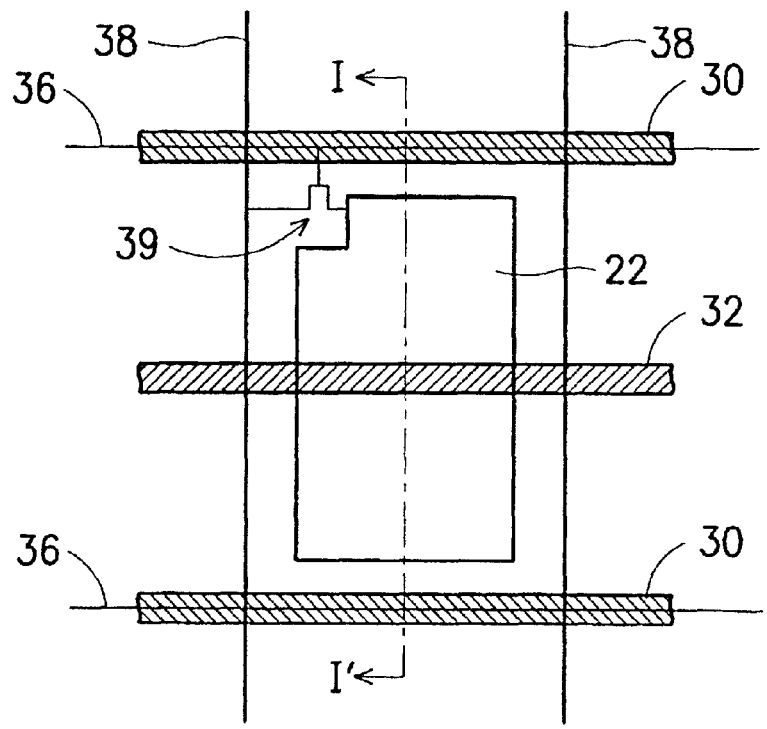
FIG. 2 is a top view of the alignment-control structure shown in FIG. 1.
Figure 3:
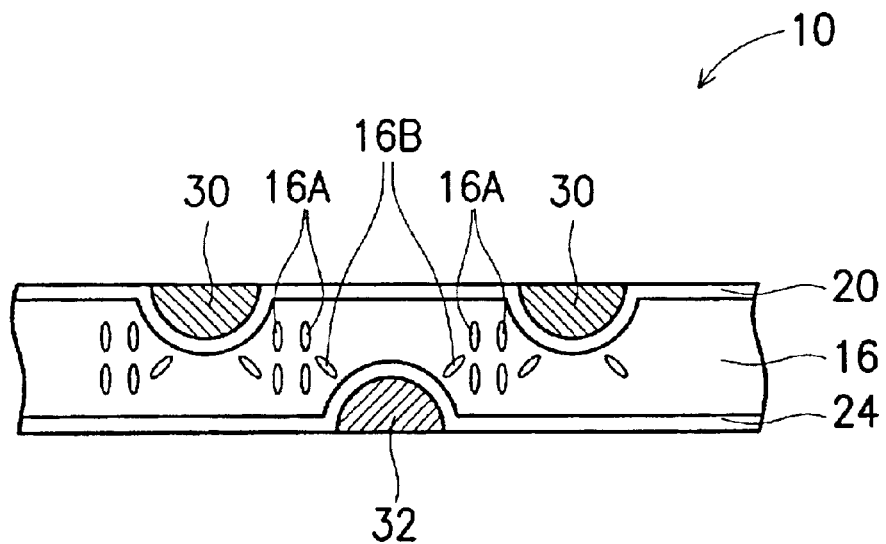
FIGS. 3 and 4 are schematic diagrams showing the variation in alignment of the liquid crystal molecules.
Figure 4:
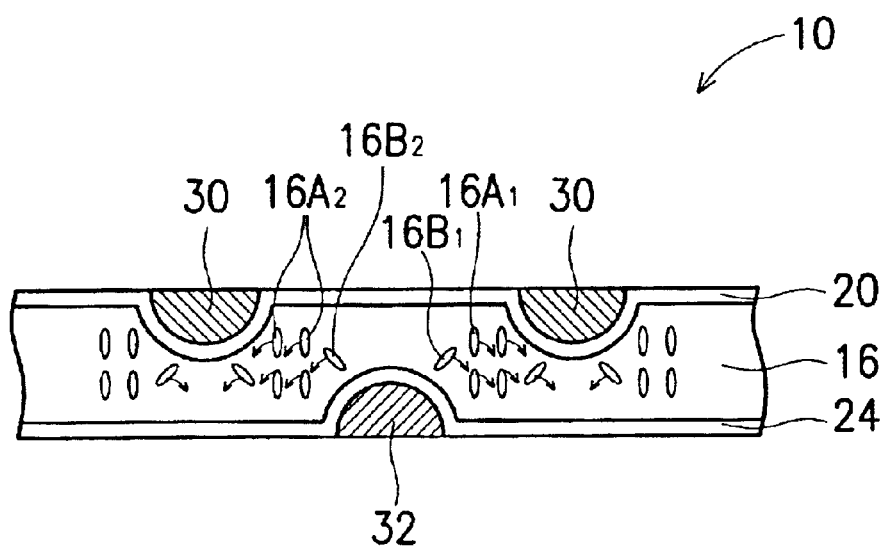
Figure 5:
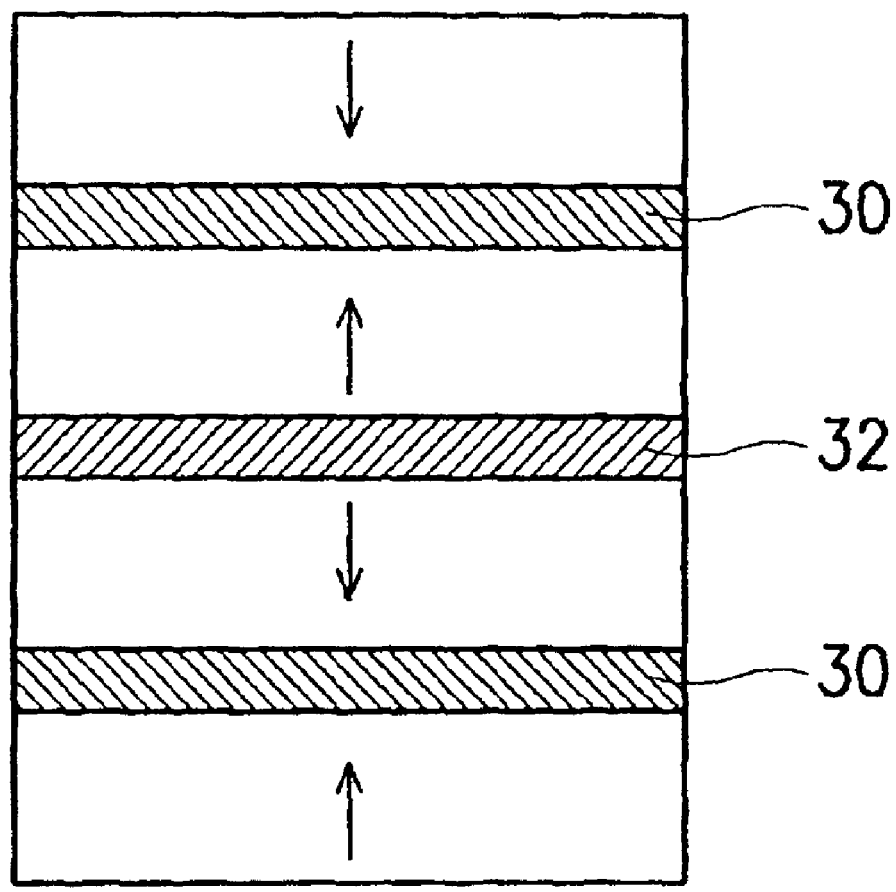
FIG. 5 is a top view showing the alignment domain of the liquid crystal layer shown in FIG. 1.
Figure 6:
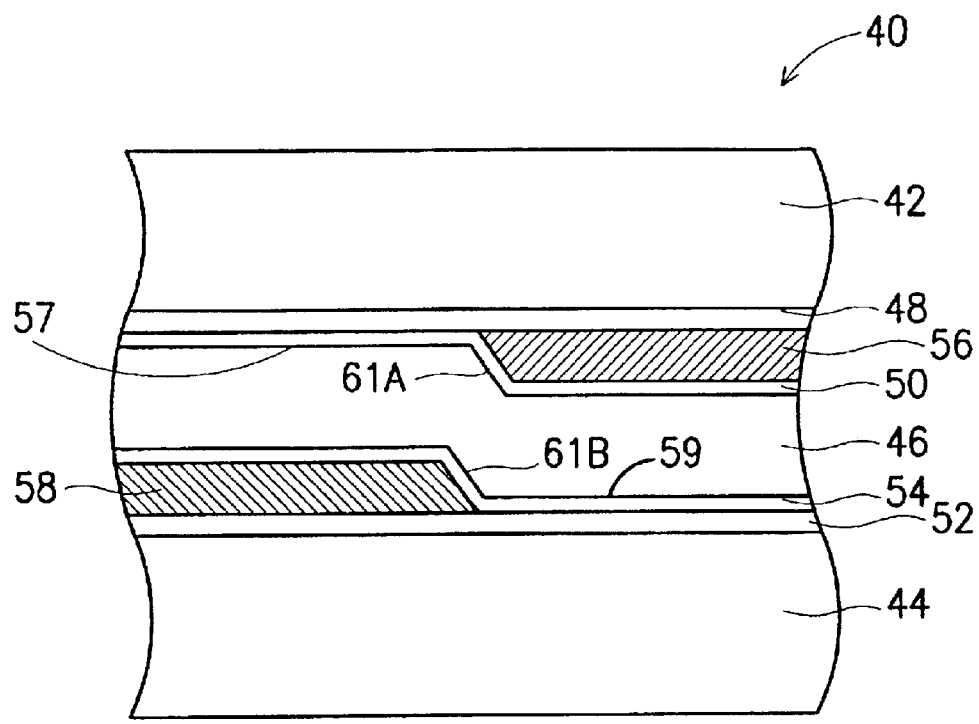
FIG. 6 is a schematic cross-sectional diagram showing an LCD cell according to the first embodiment of the present invention.
Figure 7:
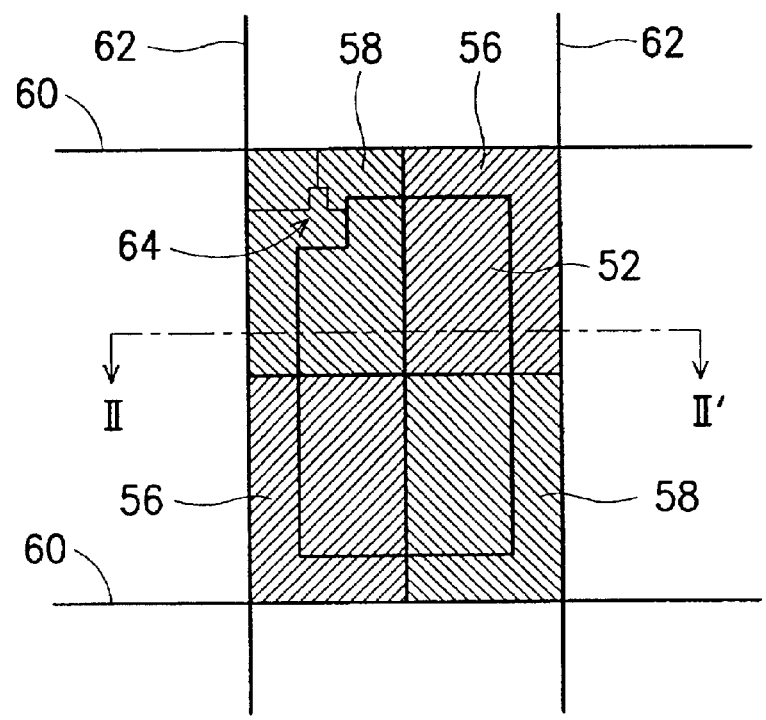
FIG. 7 is a top view of alignment-control structures shown in FIG. 6.

Referring to FIG. 6 and FIG. 7, FIG. 6 is a schematic cross-sectional diagram showing an LCD cell according to the first embodiment of the present invention. FIG. 7 is a top view of alignment-control structures. FIG. 6 is a schematic cross-sectional diagram along line II–II' of FIG. 7. As shown in FIG. 6, an LCD cell 40 has an upper glass substrate 42, a lower glass substrate 44, and a liquid crystal layer 46 with a negative anisotropy of dielectric constant filling the space between the two glass substrates 42 and 44. Two electrodes 48, 52 and two vertical alignment layers 50, 54 are respectively formed on the inner surface of the glass substrates 42 and 44. The polarizers and color filters (not shown) may be position above the glass substrates 42 and 44. In general, the upper glass substrate 42 is a color filter substrate. The lower glass substrate 44 is a thin film transistor (TFT) substrate, and a plurality of TFTs and active matrix drive circuits are formed thereon. The electrode 52 on the lower glass substrate 44 serves as a pixel electrode 52. Furthermore, the upper glass substrate 42 has a first rectangular protrusion 56 with plane surface formed on the electrode 48. The first rectangular protrusion 56 is covered by the vertical alignment layer 50 to serve as a first alignment-control structure 56. The lower glass substrate 44 has a second rectangular protrusion 58 with plane surface formed on the electrode 52. The second rectangular protrusion 58 is and covered by the vertical alignment layer 54 to serve as a second alignment-control structure 58.

As shown in FIG. 7, two transversely-extending gate lines 60 and two lengthwise-extending signal lines 62 define a rectangular pixel area, a thin film transistor (TFT) 64 is formed near the intersection of the gate line 60 and the signal line 62, and the pixel electrode 52 is formed in the pixel area. The first alignment-control structure 56 and the second alignment-control structure 58 are arranged in matrix in the pixel area. For example, the pixel area is divided into four subregions, two first alignment-control structures 56 are respectively positioned in the upper right subregion and the lower left subregion, and two second alignment-control structures 58 are respectively positioned the upper left subregion and the lower right subregion. A first concave 57 is formed on the inner surface of the upper glass substrate 42 between two adjacent first alignment-control structures 56, and the first concave 57 is in a position faced to a corresponding second alignment-control structure 58. Similarly, a second concave 59 is formed on the inner surface of the lower glass substrate 44 between two adjacent second alignment-control structures 58, and the second concave 59 is in a position faced to a corresponding first alignment-control structure 56. In addition, a first inclined plane 61A is formed between the first alignment-control structure 56 and the first cave 57, and a second inclined plane 61B is formed between the second alignment-control structure 58 and the second cave 59. In the first embodiment, the first inclined plane 61A may overlap part of the second inclined plane 61B or not. Therefore, each first alignment-control structure 56 and the corresponding second concave 59 have a first substantially equal size, the second alignment-control structure 58 and the corresponding first concave 57 have a second substantially equal size, so that the upper inclined plane 61A is close to and faces the lower inclined plane 61B.

Figure 8A:
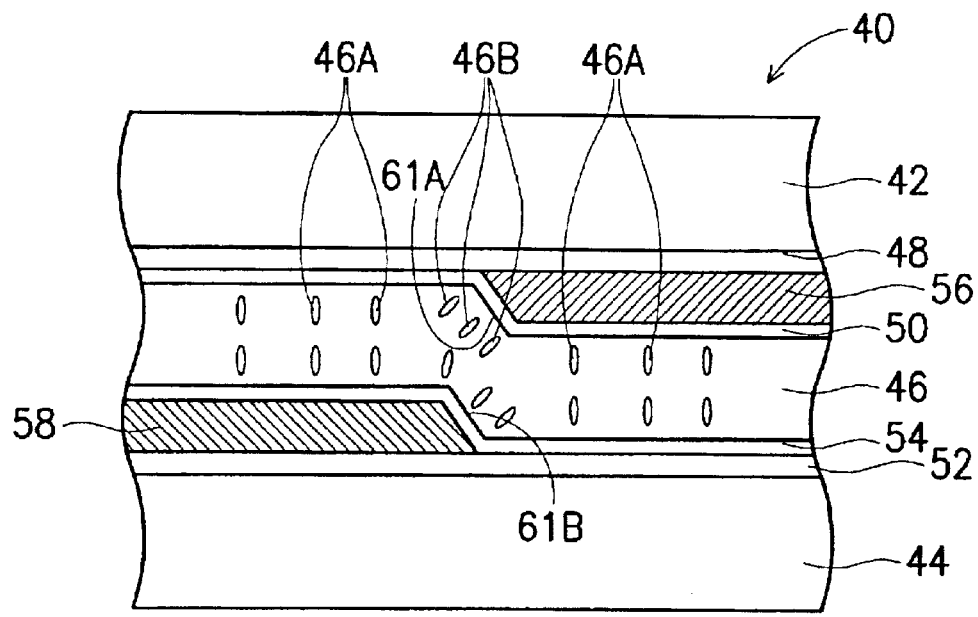
FIGS. 8A and 8B are schematic diagrams showing the variation in alignment of the liquid crystal layer when no voltage is applied as shown in FIG. 6.
Figure 8B:
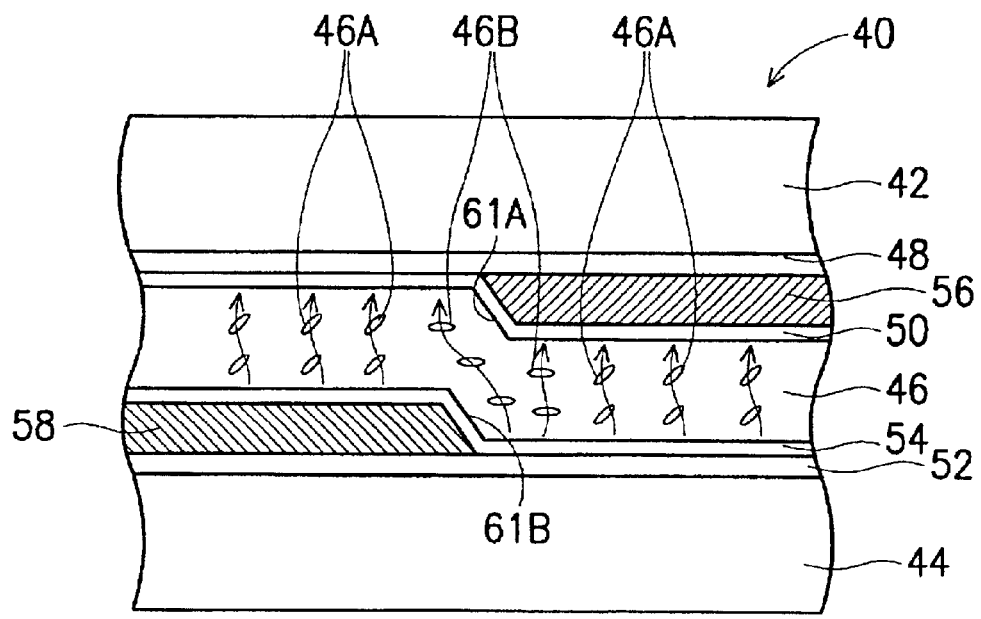

FIGS. 8A and 8B are schematic diagrams showing the structure of the liquid crystal layer 46. The materials are designed in a condition that the electric field can easily pass through the liquid crystal molecules but difficultly pass through the alignment-control structures 56 and 58.

As shown in FIG. 8A, the liquid crystal layer 46 having a negative anisotropy of dielectric constant is positioned between the vertical alignment layers 50 and 54, all the liquid crystal molecules are aligned perpendicular to the vertical alignment layers 50 and 54 when no voltage is applied thereto. For example, the liquid crystal molecules 46A are aligned perpendicular to the vertical alignment layers 50 and 54 and to the glass substrates 42 and 44. The liquid crystal molecules 46B above the inclined planes 61A and 61B are vertical to the vertical alignment layers 50 and 54 and are aligned at an angle to the glass substrates 42 and 44. As shown in FIG. 8B, upon application of voltage to the LCD cell 40, the liquid crystal molecules will rotate to a direction vertical to the electric field, and the direction of the electric field is shown by the arrows. Particularly, the electric field between the first inclined plane 61A and the second inclined plane 61B is twisted, an oblique electric field is then formed, thus the liquid crystal molecules 46B will rotate to a specific angle corresponding to the oblique electric field. For example, when the oblique electric field is from lower right direction toward the upper left direction, the liquid crystal molecules 46B are rotated toward the first alignment-control structure 56 in order to be vertical to the oblique electric field. As a result, the adjacent liquid crystal molecules 46A rotate according to the behavior of the liquid crystal molecules 46B.

Figure 9A:
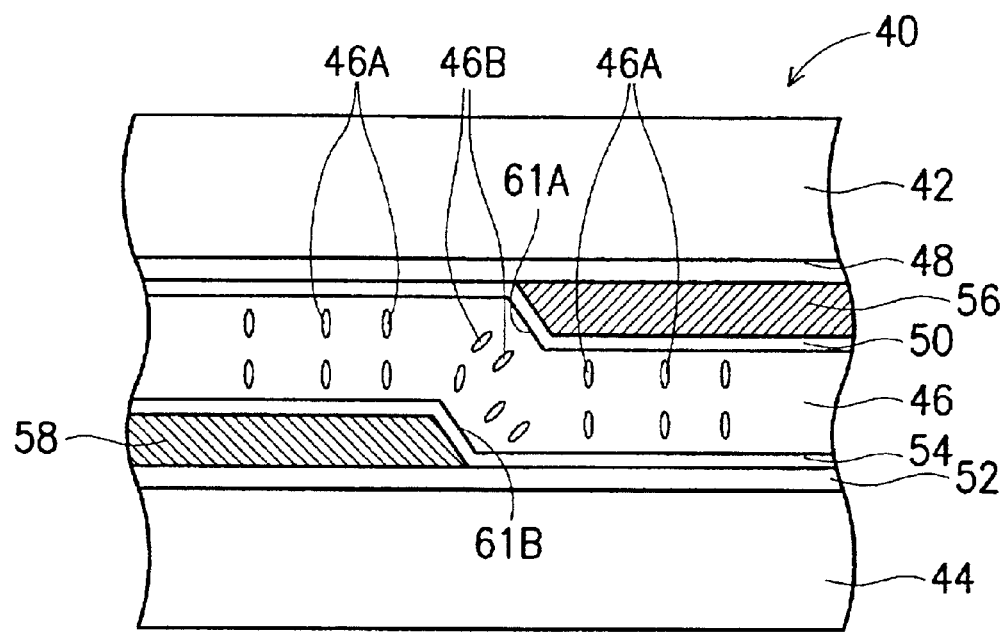
FIGS. 9A and 9B are schematic diagrams showing the variation in alignment of the liquid crystal layer when a voltage is applied as shown in FIG. 6.
Figure 9B:
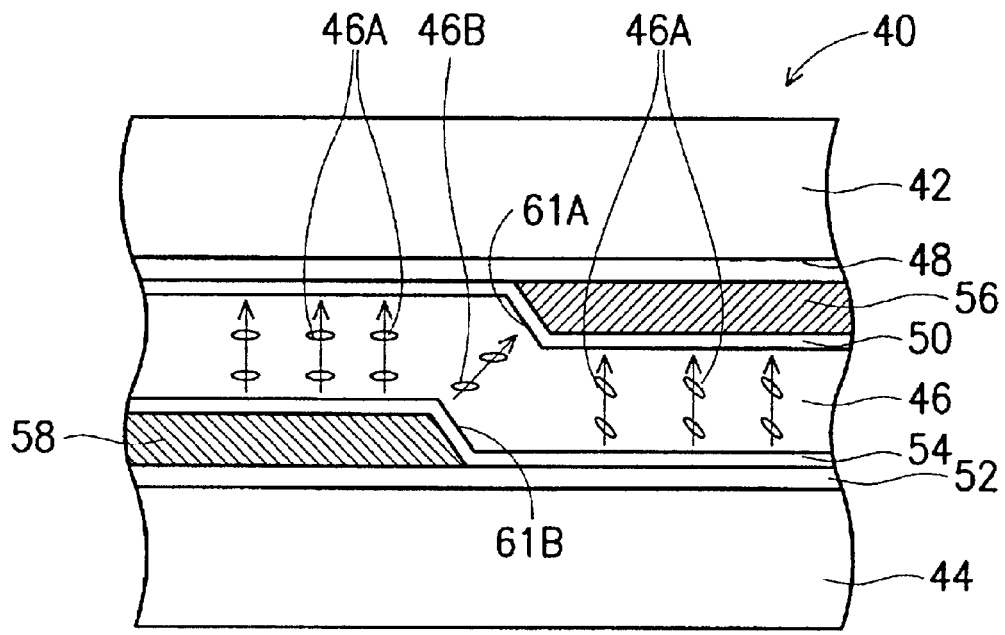

FIGS. 9A and 9B are schematic diagrams showing the variation in alignment of the liquid crystal layer 46. The materials are chosen in a condition that the electric field is difficult to pass through the liquid crystal molecules but easily pass through the alignment-control structures 56 and 58.

As shown in FIG. 9A, the liquid crystal layer 46 having a negative anisotropy of dielectric constant is arranged between the vertical alignment layers 50 and 54. All the liquid crystal molecules are aligned perpendicular to the vertical alignment layers 50 and 54 when no voltage is applied. As shown in FIG. 9B, upon application of voltage to the LCD cell 40, the liquid crystal molecules will rotate to a direction vertical to the electric field, and the direction of the electric field is shown by the arrows. The first alignment-control structure 56 and the second alignment-control structure 58 are positioned in an interlaced way. Therefore, the electric field between the first inclined plane 61A and the second inclined plane 61B is twisted, an oblique electric field is then formed, and the liquid crystal molecules 46B will rotate to a specific angle corresponding to the oblique electric field. For example, the liquid crystal molecules 46B are aligned toward the second alignment-control structure 58. As a result, the adjacent liquid crystal molecules 46A will rotate according to the behavior of the liquid crystal molecules 46B.

Figure 10A:
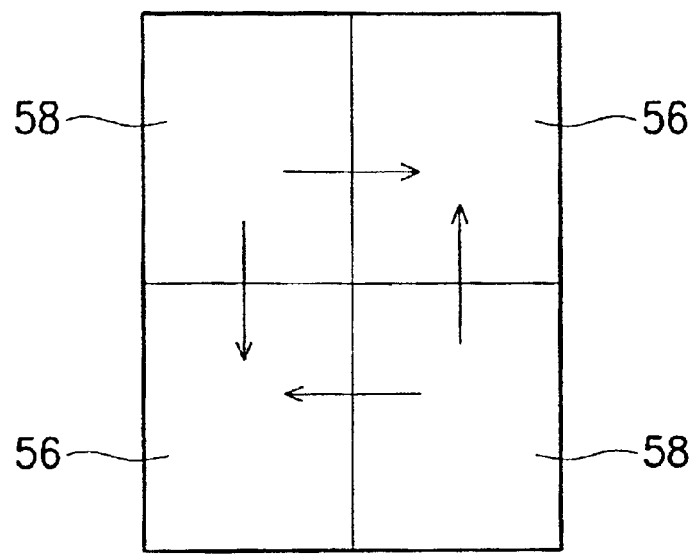
FIG. 10A is a top view showing the alignment domain of the liquid crystal layer according to the first embodiment of the present invention.
Figure 10B:
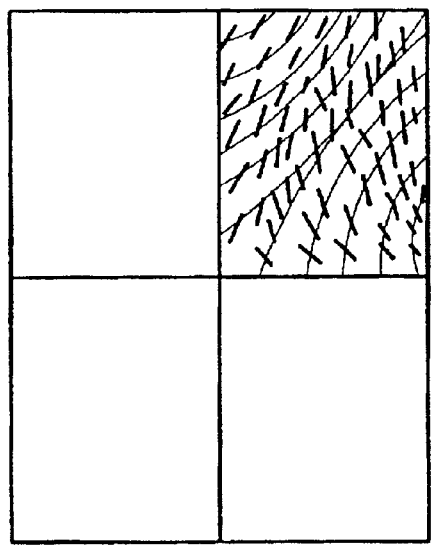
FIG. 10B is a top view showing the rotating direction of the liquid crystal molecules according to the first embodiment of the present invention.

FIG. 10A is a top view showing the alignment domain of the liquid crystal layer 46 shown by the arrows, and FIG. 10B is a top view showing the rotating direction of the liquid crystal molecules shown by the arrows. The liquid crystal molecules 48B between the inclined planes 61A and 61B rotate toward the first alignment-control structure 56 and affect the alignment of the adjacent liquid crystal molecules 46A, thus creating a gradual variation in alignment of the liquid crystal layer 46. As a result, the four alignment-control structures 56 and 58 in the pixel area contribute four domains.

Compared with the prior alignment-control structure, the first embodiment provides the LCD cell 40 with four domains in a pixel area to satisfy the requirements of wide view angle and high contrast. Also, since the alignment-control structures 56 and 58 are rectangular protrusions with plane surface, the aperture ratio is only reduced in the inclined planes 61A and 61B and no loss of the aperture ratio is happened on the plane surfaces of these alignment-control structures 56 and 58. This improves the brightness and contrast so as to assure the display quality of the LCD cell 40.

[Second Embodiment]

Figure 11:
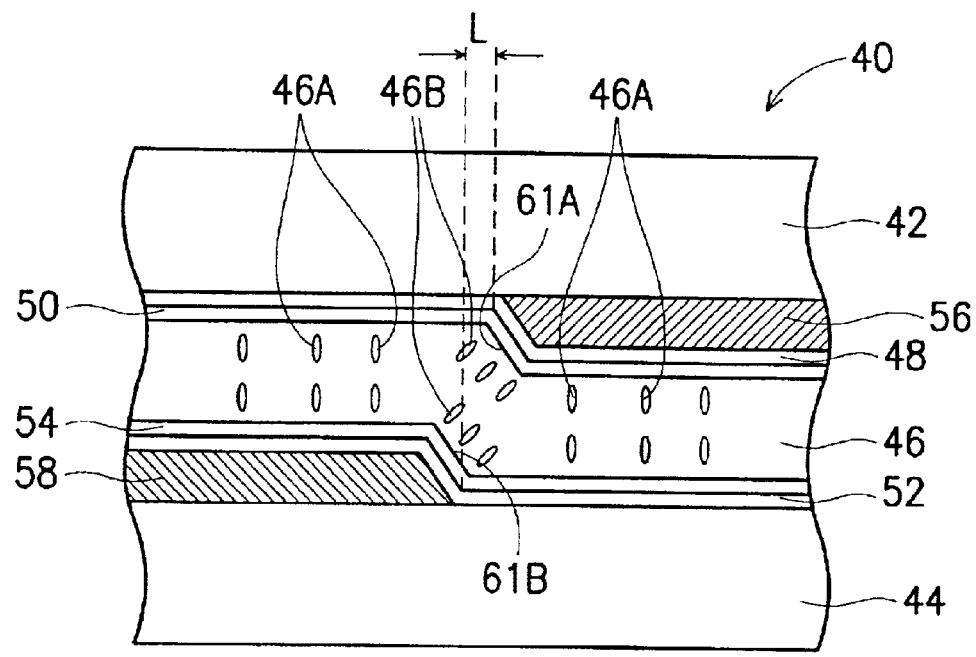
FIGS. 11 and 12 are schematic cross-sectional diagrams showing the variation in alignment of the liquid crystal layer according to the second embodiment of the present invention.
Figure 12:
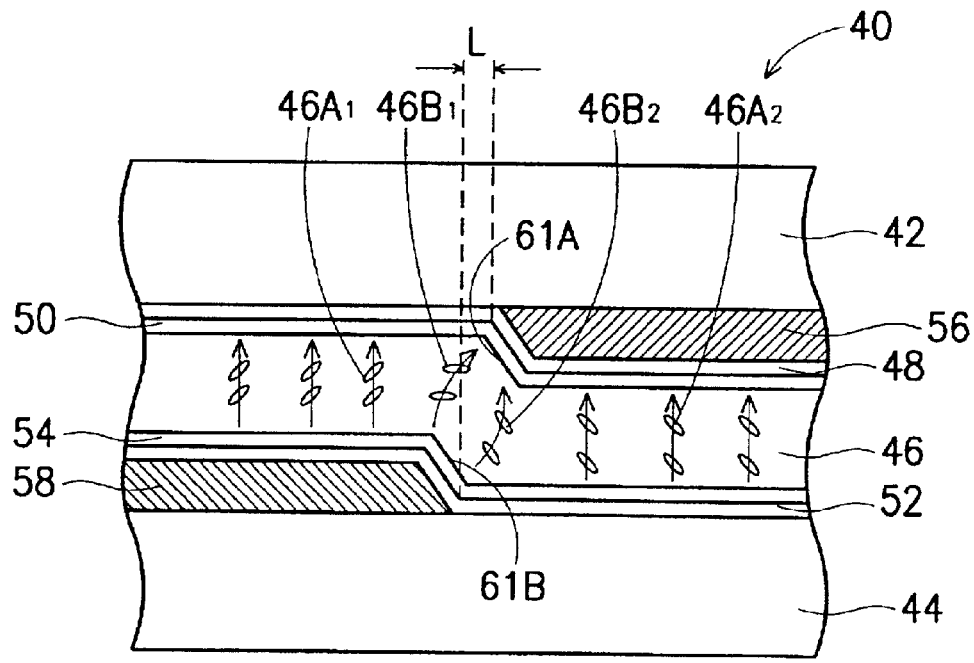

FIGS. 11 and 12 are schematic cross-sectional diagrams showing the variation in alignment of the liquid crystal layer 46 according to the second embodiment of the present invention. In the LCD cell 40 of the second embodiment, the alignment-control structures 56 and 58 are respectively formed on the inner surface of the glass substrates 42 and 44, the electrodes 48 and 52 are respectively formed on the alignment-control structures 56 and 58, and the vertical alignment layers 50 and 54 are respectively formed on the electrodes 48 and 52. As shown in FIG. 11, the vertical projections of the first inclined plane 61A and the second inclined plane 61B do not overlap. A distance L is formed between the vertical projections of the inclined planes 61A and 61B, and the distance L is about 2~3 □m. The electric field between the inclined planes 61A and 61B extends in an inclined direction when voltage is applied thereto because of the distance L.

As shown in FIG. 11, the liquid crystal layer 46 having a negative anisotropy of dielectric constant is arranged between the vertical alignment layers 50 and 54. All the liquid crystal molecules are aligned perpendicular to the vertical alignment layers 50 and 54 when no voltage is applied. As shown in FIG. 12, upon application of voltage to the LCD cell 40, an oblique electric field is formed between the first inclined plane 61A and the second inclined plane 61B, and the liquid crystal molecules 46B will rotate to a specific angle corresponding to the oblique electric field. Particularly, since the electrodes 48 and 52 are formed on the alignment-control structures 56 and 58 and the electric field extends toward the direction of the minimum distance between the electrodes 48 and 52, the electric field between the inclined planes 61A and 61B is twisted in two different directions. As a result, the liquid crystal molecules 46B between the inclined planes 61A and 61B rotate toward two different directions. For example, the liquid crystal molecules $46B_1$ positioned on the top of the second inclined plane 61B rotates in a clockwise direction, thus the adjacent liquid crystal molecules $46A_1$ also rotate in the clockwise direction according to the behavior of the liquid crystal molecules $46B_1$. In a similar method, the liquid crystal molecules $46B_2$ positioned on the top of the first inclined plane 61A rotate in a counterclockwise direction, thus adjacent liquid crystal molecules $46A_2$ also rotate in the counterclockwise direction according to the behavior of the liquid crystal molecules $46B_2$.

Figure 13A:
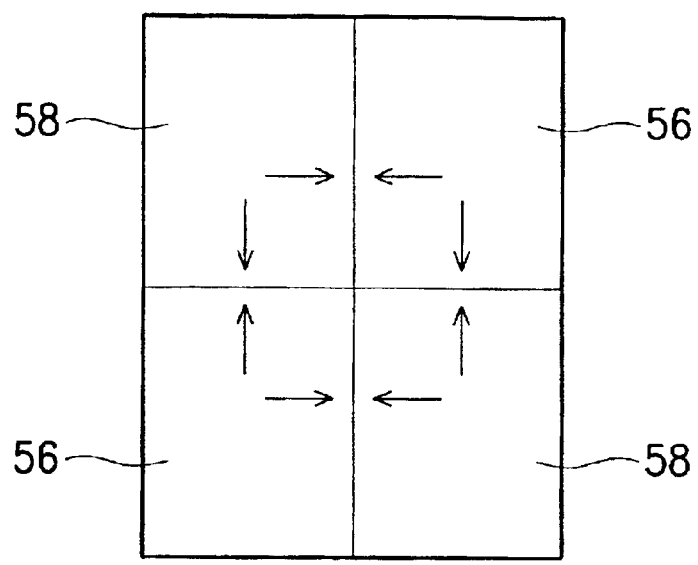
FIG. 13A is a top view showing the alignment domain of the liquid crystal layer according to the second embodiment of the present invention.
Figure 13B:
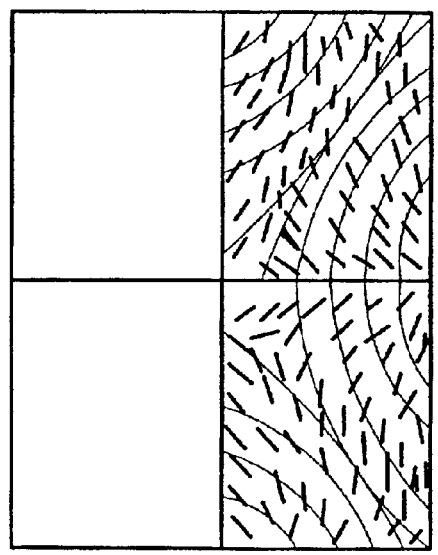
FIG. 13B is a top view showing the rotating direction of the liquid crystal molecules according to the second embodiment of the present invention.

FIG. 13A is a top view showing the alignment domain of the liquid crystal layer 46 shown by the arrows, and FIG. 13B is a top view showing the rotating direction of the liquid crystal molecules shown by the arrows. As described above, the electric field between the inclined planes 61A and 61B is twisted in two different directions, the liquid crystal molecules $46B_1$ rotate in a clockwise direction, and the liquid crystal molecules $46B_2$ rotate in a counterclockwise direction. Consequently, the four alignment-control structures 56 and 58 in the pixel area contribute four domains. This satisfies the requirements of wide view angle and high contrast, and improves the brightness and contrast so as to assure the display quality of the LCD cell 40.

Figure 14:
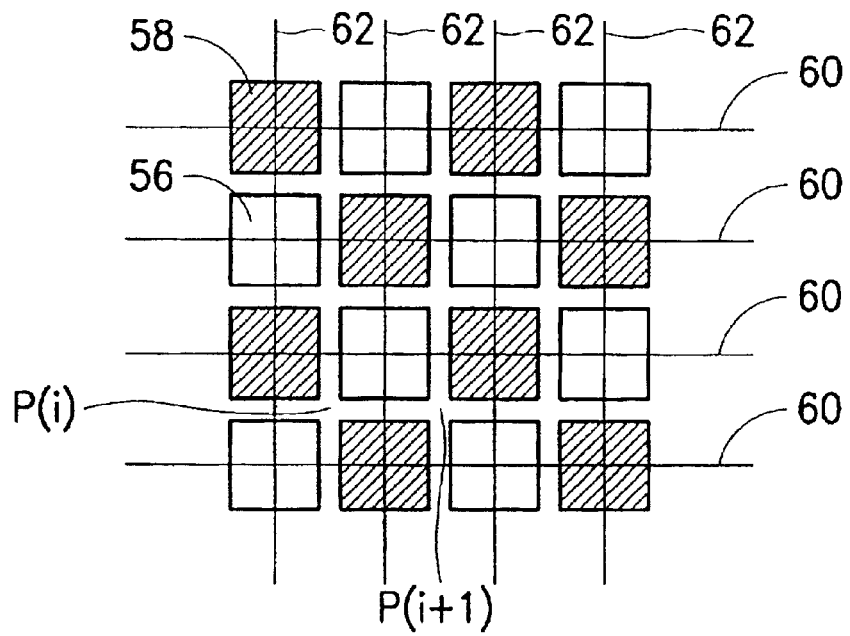
FIG. 14 is a top view of the first layout of the alignment-control structure according to the present invention.

FIG. 14 is a top view of the first layout of the alignment-control structure according to the present invention. According to the design rule of the alignment-control structure in the first embodiment and the second embodiment, two of the first alignment-control structures 56 and two of the second alignment-control structures 58 are arranged in one pixel area. These first and second alignment-control structures 56 and 58 are arranged in matrix in the LCD cell 40. For example, within the pixel area P(i), the first alignment-control structures 56 are formed on the upper right subregion and the lower left subregion, and the second alignment-control structures 58 are formed on the upper left subregion and the lower right subregion. In the adjacent pixel area P(i+1), the first alignment-control structures 56 are formed on the upper left subregion and the lower right subregion, and the second alignment-control structures 58 are formed on the upper right subregion and the lower left subregion.

Figure 15:
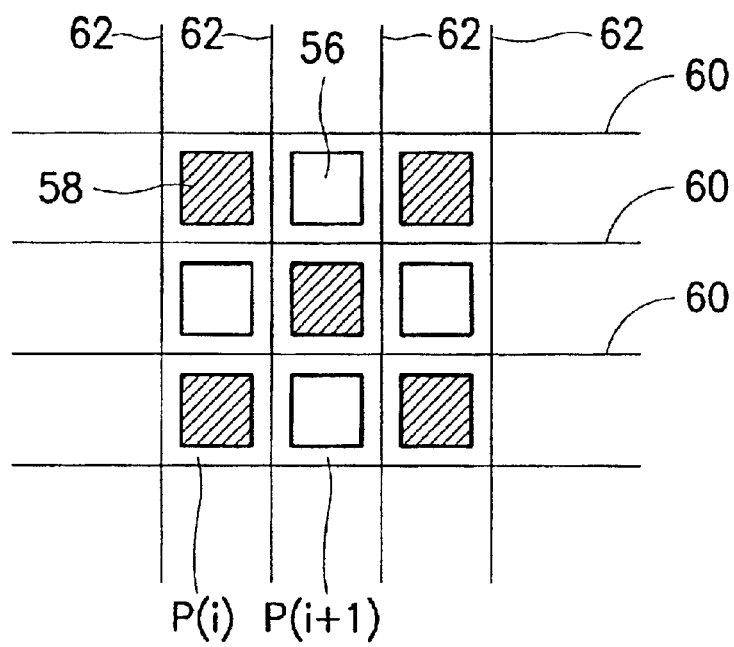
FIG. 15 is a top view of the second layout of the alignment-control structure according to the present invention.

In addition, the layout of the alignment-control structures may be in a variety of patterns to achieve multiple domains in a pixel area. FIG. 15 is a top view of the second layout of the alignment-control structure according to the present invention. The first alignment-control structures 56 and the second alignment-control structures 58 are arranged in matrix in the LCD cell 40, wherein one of the first alignment-control structures 56 or the second alignment-control structures 58 are formed on one pixel area to generate one domain. For example, the second alignment-control structures 58 are formed on the pixel area P(i), and the first alignment-control structures 56 are formed on the adjacent pixel area P(i+1).

Figure 16:
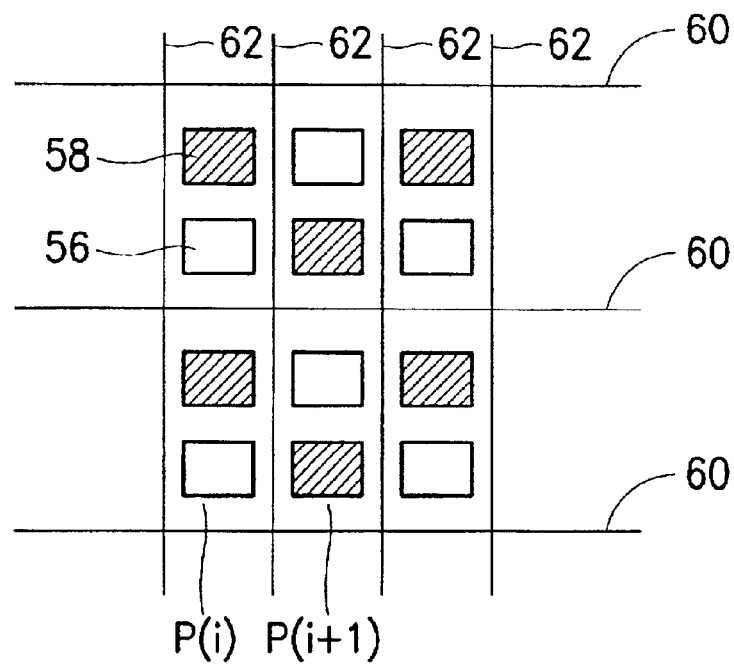
FIG. 16 is a top view of the third layout of the alignment-control structure according to the present invention.

FIG. 16 is a top view of the third layout of the alignment-control structure according to the present invention. The first alignment-control structures 56 and the second alignment-control structures 58 are arranged in matrix in the LCD cell 40. Only One of the first alignment-control structure 56 and only one of the second alignment-control structure 58 are formed in one pixel area to generate two domains. For example, in the pixel area P(i), the first alignment-control structure 56 is formed in the lower subregion and the second alignment-control structure 58 is formed in the upper subregion. In the adjacent pixel area P(i+1), the first alignment-control structure 56 is formed in the upper subregion and the second alignment-control structure 58 is formed on the lower subregion.

Figure 17:
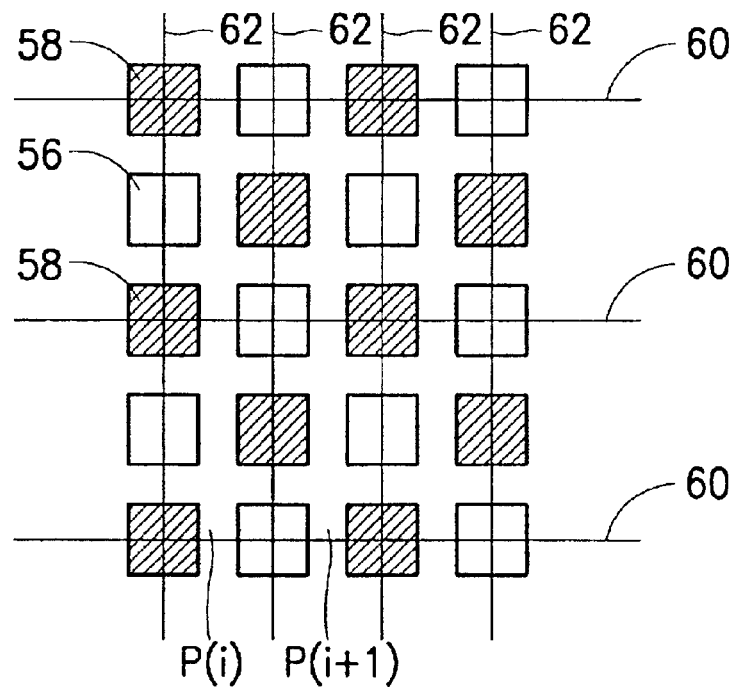
FIG. 17 is a top view of the fourth layout of the alignment-control structure according to the present invention.

FIG. 17 is a top view of the fourth layout of the alignment-control structure according to the present invention. The first alignment-control structures 56 and the second alignment-control structures 58 are arranged in matrix in the LCD cell 40. In one pixel area, three of the first alignment-control structures 56 and three of the second alignment-control structures 58 are formed to generate six domains.

It is to be understood that the present invention is not limited to the embodiments described above, but encompasses any and all embodiments within the scope of the following claims.

What is claimed is:

1. A liquid crystal display (LCD) comprising:
    an upper substrate having an upper electrode on an inner surface of the upper substrate;
    a lower substrate having lower electrodes respectively arranged in areas defined by gate lines and signal lines and on an inner surface of the lower substrate, an electric field being formed between the upper electrode and the lower electrodes;
    a liquid crystal layer with a negative anisotropy of dielectric constant filling a space between the upper substrate and the lower substrate;
    a plurality of first alignment-control structures arranged on the inner surface of the upper substrate, wherein a first concave is formed between two adjacent first alignment-control structures, and a first inclined plane is formed between each first concave and each first alignment-control structure; and
    a plurality of second alignment-control structures arranged on the inner surface of the lower substrate, wherein a second concave is formed between two adjacent second alignment-control structures, and a second inclined plane is formed between each second concave and each second alignment-control structure;
    wherein, the first alignment-control structures and the second alignment structures are alternately arranged on the intersections of the gate lines and the signal lines;
    wherein each first alignment-control structure is positioned above a corresponding second concave, each second alignment-control structure is positioned under a corresponding first concave, the first alignment-control structure and the corresponding second concave have a first substantially equal size, the second alignment-control structure and the corresponding first concave have a second substantially equal size, and the first inclined plane faces the second inclined plane.

2. The LCD according to claim 1, wherein each of the first alignment-control structures and the second alignment-control structures is a rectangular protrusion.

3. The LCD according to claim 2, wherein each rectangular protrusion comprises a plane surface.

4. The LCD according to claim 2, wherein each rectangular protrusion comprises a tapered sidewall.

5. The LCD according to claim 1, wherein the first alignment-control structure is below the upper electrode and the second alignment-control structure is below the lower electrodes.

6. The LCD according to claim 1, wherein the first alignment-control structure is formed above the upper electrode and the second alignment-control structure is formed above the lower electrodes.

7. The LCD according to claim 1, further comprises an upper vertical alignment layer and a lower vertical alignment layer, wherein the liquid crystal layer with the negative anisotropy of dielectric constant is perpendicular to the upper and lower vertical alignment layers when no electrical field is applied to the LCD.

8. A liquid crystal display (LCD) comprising:
    an upper substrate having an upper electrode on an inner surface of the upper substrate;
    a lower substrate having lower electrodes respectively arranged in areas defined by gate lines and signal lines and on an inner surface of the lower substrate, an electric field being formed between the upper electrode and the lower electrodes;
    a liquid crystal layer with a negative anisotropy of dielectric constant filling a space between the upper substrate and the lower substrate;

a plurality of first alignment-control structures arranged on the inner surface of the upper substrate, wherein a first concave is formed between two adjacent first alignment-control structures, and a first inclined plane is formed between each first concave and each first alignment-control structure; and a plurality of second alignment-control structures arranged on the inner surface of the lower substrate, wherein a second concave is formed between two adjacent second alignment-control structures, and a second inclined plane is formed between each second concave and each second alignment-control structure;

wherein, the first alignment-control structures and the second alignment structures are alternately arranged on the intersections of the and signal lines;

wherein, the first alignment-control structure is positioned above a corresponding second concave, the second alignment-control structure is positioned under a corresponding first concave, the first alignment-control structure and the corresponding second concave have a first substantially equal size, the second alignment-control structure and the corresponding first concave have a second substantially equal size, and the first inclined plane is close to and faces the second inclined plane.

9. The LCD according to claim 8, wherein each of the first alignment-control structures and the second alignment structures is a rectangular protrusion each of the first alignment-control structures and the second alignment structures is a protrusion with a plane surface, and the plane surface is a shape having four right angles.

10. The LCD according to claim 9, wherein each rectangular protrusion each of the first alignment-control structures and the second alignment-control structures comprises a tapered sidewall.

11. The LCD according to claim 8, wherein at least one first alignment-control structure or second alignment-control structure is arranged on the intersection of each gate line and each signal line.

12. The LCD according to claim 8, wherein the first alignment-control structure is below the upper electrode and the second alignment-control structure is below the lower electrodes.

13. The LCD according to claim 8, wherein the first alignment-control structure is formed above the upper electrode and the second alignment-control structure is formed above the lower electrodes.

14. The LCD according to claim 8, further comprises an upper vertical alignment layer and a lower vertical alignment layer, wherein the liquid crystal layer with the negative anisotropy of dielectric constant is perpendicular to the upper and lower vertical alignment layers when no electrical field is applied to the LCD.

* * * * *